(12) United States Patent
May

(10) Patent No.: US 7,117,862 B2
(45) Date of Patent: Oct. 10, 2006

(54) ADAPTIVE ENGINE CONTROL

(75) Inventor: Andrew May, Wauwatosa, WI (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/840,406

(22) Filed: May 6, 2004

(65) Prior Publication Data

US 2005/0247288 A1 Nov. 10, 2005

(51) Int. Cl.
F02B 43/04 (2006.01)

(52) U.S. Cl. .................. 123/674; 123/1 A; 73/35.02

(58) Field of Classification Search ............... 123/1 A, 123/674, 344, 492, 493; 73/35.02, 117.3
See application file for complete search history.

(56) References Cited

U.S. PATENT DOCUMENTS

| | | | |
|---|---|---|---|
| 4,184,461 A * | 1/1980 | Leung .................. | 123/492 |
| 4,867,127 A | 9/1989 | Quirchmayr et al. | |
| 4,905,649 A * | 3/1990 | Washino et al. ........... | 73/117.3 |
| 5,237,983 A | 8/1993 | Willey et al. | |
| 5,400,762 A * | 3/1995 | Fodale et al. ............ | 123/674 |
| 5,467,755 A * | 11/1995 | Konrad et al. ........... | 123/674 |
| 5,469,831 A | 11/1995 | Takahashi | |
| 5,515,280 A * | 5/1996 | Suzuki ................... | 123/1 A |
| 5,586,537 A * | 12/1996 | Tomisawa et al. ........ | 73/35.02 |
| 5,657,732 A | 8/1997 | Wolters et al. | |
| 5,711,272 A * | 1/1998 | Maegawa et al. ......... | 123/1 A |
| 5,732,681 A * | 3/1998 | Ogita .................... | 123/492 |
| 5,817,923 A * | 10/1998 | Ohsaki et al. ........... | 123/1 A |
| 5,911,210 A | 6/1999 | Flach | |
| 5,949,146 A | 9/1999 | VandenBerghe | |
| 6,189,523 B1 | 2/2001 | Weisbrod et al. | |
| 6,269,300 B1 | 7/2001 | Moore-McKee et al. | |
| 6,279,560 B1 * | 8/2001 | Mauro et al. ............ | 123/674 |
| 6,289,877 B1 | 9/2001 | Weisbrod et al. | |
| 6,340,005 B1 | 1/2002 | Keast et al. | |
| 6,470,868 B1 * | 10/2002 | Nakagawa et al. ........ | 123/673 |
| 6,474,308 B1 * | 11/2002 | Okumura et al. ........ | 73/35.02 |
| 6,520,168 B1 | 2/2003 | Ishii et al. | |
| 6,564,774 B1 | 5/2003 | Ellims et al. | |
| 6,567,709 B1 | 5/2003 | Malm et al. | |
| 6,591,822 B1 | 7/2003 | Dohta | |
| 6,612,269 B1 | 9/2003 | Heffel et al. | |
| 6,725,831 B1 | 4/2004 | Asano et al. | |
| 6,728,625 B1 | 4/2004 | Strubhar et al. | |
| 2002/0185086 A1 | 12/2002 | Newman et al. | |
| 2003/0000574 A1 | 1/2003 | Cordier et al. | |

FOREIGN PATENT DOCUMENTS

| | | |
|---|---|---|
| DE | 4117440 | 12/1991 |
| DE | 19510592 | 9/1995 |
| EP | 0997628 | 5/2000 |

OTHER PUBLICATIONS

International Search Report issued in PCT Application No. PCT/US2005/016176; Sep. 9, 2005; 7 pages.

* cited by examiner

*Primary Examiner*—Erick R Solis
(74) *Attorney, Agent, or Firm*—Fish & Richardson P.C.

(57) ABSTRACT

An engine system has an engine control module for controlling a ratio of air and fuel supplied to an engine. The engine control module controls the ratio of air and fuel in relation to a fuel parameter related to the specific energy of the fuel or the stoichiometry of the combustion reaction. The fuel parameter is updated in relation to the engine's performance.

38 Claims, 6 Drawing Sheets

ADAPTIVE ENGINE CONTROL

TECHNICAL FIELD

This disclosure relates to internal combustion engines, and more particularly to operating internal combustion engines.

BACKGROUND

Variances in fuel composition being supplied to an internal combustion engine can affect the engine's performance. If the fuel composition changes in a manner that affects the specific energy of the fuel or the stoichiometry of the combustion reaction, the amount of fuel supplied to the engine must be adjusted to maintain the engine's performance. Some engine systems compensate for variances in the fuel being supplied to the engine by sensing the fuel composition before combustion and effecting a predetermined fuel map for the particular fuel composition. Such systems, however, are generally configured to sense changes in only specific components of the fuel, for example, to sense the ratio of one fuel to another in a composite fuel. By sensing specific components of the fuel, these systems ignore other variances. These variances may have a substantial impact on the engine's performance.

Therefore, there is a need for an engine system that compensates for changes in fuel beyond variances in specific fuel components.

SUMMARY

The disclosure describes systems and techniques relating to compensating for variances in fuel composition in relation to the variances' impact on the performance of the engine system.

An illustrative engine system includes an engine and an air/fuel regulator adapted to control at least one of an amount of air and an amount of fuel supplied to the engine. A sensor is coupled to the engine and adapted to sense a characteristic indicative of the engine's performance. The engine system includes a controller coupled to the sensor and to the air/fuel regulator. The controller is adapted to signal the air/fuel regulator to control at least one of the amount of air and the amount of fuel supplied to the engine over a range of engine operation in response to a plurality of engine control set-points and a fuel parameter. The engine control set-points are adapted to operate the engine within the range of engine operation. The controller is further adapted to adjust the fuel parameter as a function of the engine's performance. The fuel parameter is indicative of a composition of the fuel.

In an illustrative method, an air/fuel mixture supplied to an engine over a range of engine operating conditions is adjusted as a function of a plurality of engine set-points adapted to operate the engine within the range and a fuel parameter. A signal that is indicative of the engine's performance is received and the fuel parameter is adjusted in relation to the engine's performance.

In another illustrative implementation, an article includes a machine-readable medium storing instructions adapted to cause one or more machines to perform operations. The operations include determining a regulator control signal over a range of engine operation in relation to a plurality of engine set-points adapted to operate the engine within the range and a fuel parameter. The regulator control signal is adapted to signal a regulator to adjust an air/fuel mixture supplied to an engine. The operations further include receiving a signal indicative of the engine's performance and adjusting the fuel parameter in relation to the engine's performance.

The details of one or more implementations of the invention are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
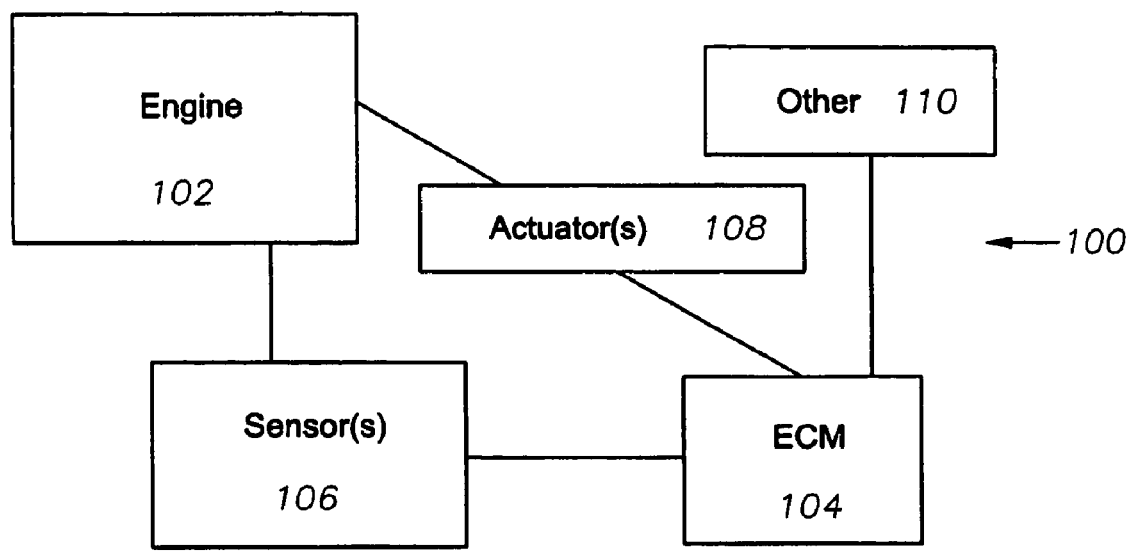
FIG. 1 is a schematic of an engine system constructed in accordance with the invention.

Referring first to FIG. 1, an illustrative engine system 100 constructed in accordance with the invention is depicted schematically. The engine control system 100 includes an engine control module (ECM) 104 operably coupled to communicate with one or more engine sensors 106 and one or more actuators 108. The engine sensors 106 may be coupled to an internal combustion engine 102, and sense one or more operating characteristics of the engine 102 and/or engine system 100 and output a signal indicative of the operating characteristic. Some examples of typical engine operating characteristics include engine speed, a torque indicating characteristic such as manifold absolute pressure (MAP) or intake manifold density (IMD), power output of the engine, a characteristic indicative of the engine's air to fuel ratio such as exhaust oxygen content, ambient and/or intake temperature, ambient pressure, and others. The actuators 108 are adapted to control various engine system components (not specifically shown) used in controlling the engine and other engine system components. Some examples of typical engine components include a throttle, a turbocharger bypass or wastegate, an ignition system, air/fuel regulating device such as an adjustable fuel mixer, a fuel pressure regulator, fuel injectors and others. The ECM 104 may also be coupled to communicate with other components 110. Some examples of other components 110 can include a user interface that allows a user to query the ECM 104 or input data or instructions to the ECM 104, one or more external sensors that sense information other than the operating characteristics of the engine or engine system, monitoring or diagnostic equipment to which the ECM 104 can communicate characteristics of the system, and others.

Figure 2:
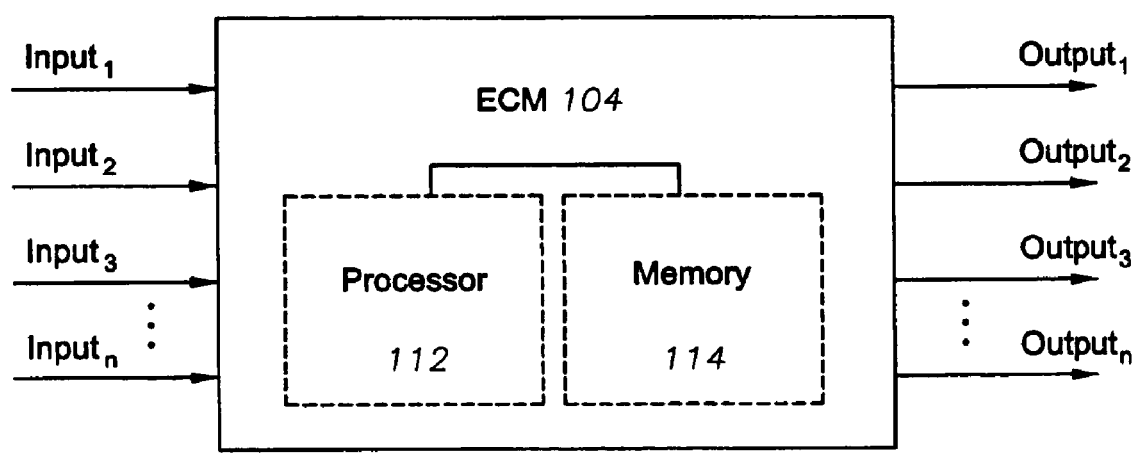
FIG. 2 is a schematic of an engine control module for use in an engine system constructed in accordance with the invention.

Referring to FIG. 2, the ECM 104 includes a processor 112 operably coupled to a computer readable medium or memory 114. The computer readable medium 114 may be wholly or partially removable from the ECM 104. The computer readable medium 114 contains instructions used by the processor 112 to perform one or more of the methods described herein. The ECM 104 can receive one or more input signals ($input_1 \ldots input_n$), such as from the sensors 106, actuators 108, and other components 110 and can output one or more output signals ($output_1 \ldots output_n$), such as to the sensors 106, actuators 108 and other components 110.

The ECM 104 operates to accelerate or decelerate the engine 102 (FIG. 1) to a specified operating state, for example a specified speed or torque output, and to maintain the engine in steady state operation. To this end, the ECM 104 receives input from the sensors 106, including engine state parameters, and determines and outputs one or more actuator control signals adapted to control the actuators 108 to operate the engine 102.

Figure 3:
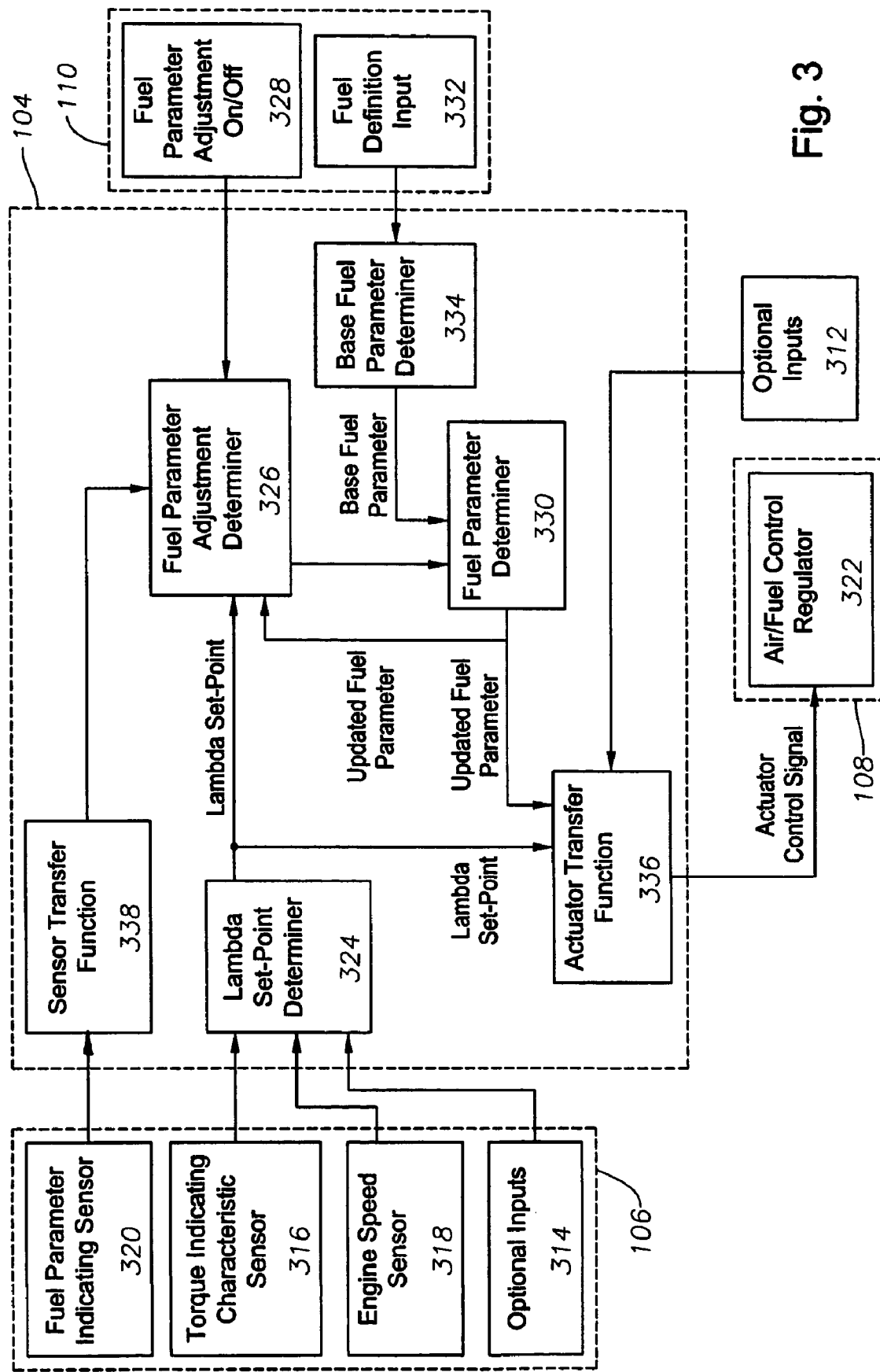
FIG. 3 is a schematic of the functional operation of an engine system constructed in accordance with the invention.

FIG. 3 depicts an illustrative ECM 104 adapted to operate the engine at a specified steady state condition. It is within the scope of the invention to provide the ECM 104 to operate the engine at a steady state speed, torque output or other specified operating states. The illustrative ECM 104 of FIG. 3 controls a ratio of air and fuel in a combustion mixture supplied to the engine. The operation of the engine may also be affected by a governor (not specifically shown), such as a proportional/integral/differential controller acting to control the engine in speed or torque, separate from or incorporated into the ECM 104. The governor is operable to control an actuator 108, such as that of a throttle valve in the engine's intake, to control the amount of combustion mixture supplied to the engine.

The illustrative ECM 104 of FIG. 3 receives an input of engine state parameters from the sensors 106 including a torque indicating characteristic sensor 316, such as a MAP or IMD sensor, an engine speed sensor 318, and a fuel parameter indicating sensor 320. The fuel parameter indicating sensor 320 outputs a signal indicative of the engine's performance on the fuel being supplied to it, whether the fuel is a single fuel, such as natural gas or diesel, or a composite of one or more fuels. Some examples of fuel parameter indicating sensors 320 can include an air to fuel ratio (lambda) sensor, such as an oxygen sensor measuring exhaust from the engine, an engine output power sensor, such as a kilowatt sensor coupled to a generator (not specifically shown) being driven by the engine, an infrared fuel constituent sensor, or other fuel parameter indicating sensor. The actuators 108 include at least an air/fuel control regulator 322 operable to control a ratio of air and fuel supplied to the engine. Examples of air/fuel control regulators 322 include a fuel pressure regulator or air bypass in an engine system using a fixed orifice area air/gas mixer, an adjustable orifice area air/gas mixer, one or more fuel injectors or other air/fuel regulator. The ECM 104 receives an input from the torque indicating characteristic sensor 316, the engine speed sensor 318, and the fuel parameter indicating sensor 320, and determines and outputs an actuator control signal to control the operation of the air/fuel control regulator 322 as is discussed below.

The ECM 104 includes a lambda set-point determiner 324 that receives one or more engine state parameters and determines and outputs a lambda set-point. As is discussed in more detail below, the lambda set-point is used together with a fuel parameter in determining an actuator control signal operable to control the air/fuel control regulator 322. It is within the scope of the invention to determine and use other engine set-points than lambda set-points. In determining a lambda set-point, the illustrative ECM 104 uses engine speed from the engine speed sensor 318, a torque indicating characteristic (e.g. MAP or IMD) from the torque indicating characteristic sensor 316 and optionally other parameters, for example, ambient and/or intake temperature. It is also anticipated that the ECM 104 uses other sensors alternatively or in combination with those discussed above, such as a mass-air sensor or flow volume sensor.

The lambda set-point determiner 324 can determine the lambda set-point using a look-up table including at least values indicative of engine speed and torque indicating characteristics correlated to lambda set-points determined to maintain steady state engine operation. Alternately or in combination with a look-up table, the lambda set-point determiner 324 can determine the lambda set-point using a formulaic calculation as a function of inputs from one or more of the sensors 106, for example, engine speed and torque indicating characteristic. In either instance, the lambda set-point is selected in relation to the respective engine speed and torque indicating characteristic values to provide a specified combustion mixture to the engine to maintain steady state operation. Therefore, different lambda set-points may effectuate different engine operating states. The lambda set-point determiner 324 is calibrated relative to a fuel having a specified specific energy or stoichiometry, or as will be apparent below, a specific fuel parameter.

The actuator transfer function 336 receives at least the lambda set-point and a fuel parameter, and determines an actuator control signal adapted to operate the air/fuel control regulator 322. The actuator transfer function 336 can receive and account for other inputs in determining the actuator control signal, such as, the engine state parameters discussed above, fuel pressure, ambient pressure, intake temperature, ambient temperature, and others. The actuator transfer function 336 determines the actuator control signal using a look-up table correlating lambda set-points, fuel parameters, and any other inputs to actuator control signals, by calculation as a function of the lambda set-point, the fuel parameter, and any other inputs, by a combination of a look-up table and a calculation, or by other method. In one illustrative ECM 104, the lambda set-point can be transformed to a pre-signal using a look-up table, and the fuel parameter applied in a calculation to offset the pre-signal in determining the actuator control signal. Alternately, the fuel parameter can be applied as an adder (negative or positive) or multiplier to the lambda set-point and the actuator control signal determined using a look-up table or by calculation as a function of the lambda set-point and any other inputs.

The fuel parameter is a value that is indicative of, or related to, the specific energy or the stoichiometry of the combustion reaction of the fuel supplied to the engine. In one instance, the fuel parameter may be derived from a fuel definition indicative of the composition of the fuel, for example, a fuel grade, a fuel quality related to how the fuel deviates in terms of diluents from a specified fuel, or a fuel type related to the amount of certain components (i.e. natural gas, diesel, or other) contained in the fuel. It is within the scope of the invention to use other fuel definitions. The fuel definition can be input to the ECM 104 via a fuel definition input 332 and the ECM 104 then determines the fuel parameter with a base fuel parameter determiner 334. Alternately, the fuel parameter may be pre-set and thereafter updated to accurately reflect the fuel supplied to the engine by the ECM 104 using the fuel parameter indicating sensor 320 as is discussed below. In an instance where the fuel definition 332 is specified, the base fuel parameter determiner 334 can determine the fuel parameter using a look-up table correlating fuel definitions and fuel parameters or by calculation as a function of the fuel definition. Use of a fuel parameter in determining the actuator control signal for the air/fuel control regulator 322 enables the ECM 104 to adjust for variances in the fuel being supplied to the engine 102 that may affect the engine's performance.

The ECM 104 may be configured to determine and update the fuel parameter based on the performance of the engine 102. To this end, the ECM 104 includes a fuel parameter adjustment determiner 324 that receives an input from the fuel parameter indicating sensor 320 together with the lambda set-point and optionally a fuel parameter, and outputs a fuel parameter adjustment. The fuel parameter adjustment is a function of the difference between an expected engine performance to its fuel supply and a measured engine performance measured by the fuel parameter indicating sensor 320. The fuel parameter adjustment determiner 326 determines the expected engine performance from at least the lambda set-point. Other values may be used in determining the expected engine performance, such as, intake temperature, a prior determined fuel parameter, engine speed, and an engine torque indicating parameter. The fuel parameter adjustment determiner 326 can determine the expected engine performance from a look-up table containing correlated values of at least the fuel parameter and expected engine performance or from a formulaic calculation as a function of at least the lambda set-point. The fuel parameter adjustment determiner 326 may determine the fuel parameter adjustment using a finite impulse response (FIR) filter with calibratable time constant, an infinite impulse response (IIR) filter with calibratable time constant, a proportional/integral/differential (PID) controller, Kalman filter, or other type of determination.

The fuel parameter adjustment determiner 326 may also include feed forward compensation, similar to that discussed above, by communicating with a load of a controller for a load applied to the engine and anticipating engine output requirements based on upcoming changes in load. The fuel parameter adjustment determiner 326 may optionally use the fuel parameter in determining the fuel parameter adjustment, for example, in determining the expected engine performance or as a modifier to affect the response of the FIR filter, IIR filter, Kalman filter, or PID controller.

In an instance where the fuel parameter adjustment determiner 326 uses an FIR filter, IIR filter, Kalman filter, or PID controller to determine the fuel parameter adjustment, the magnitude of the adjustment is intelligently determined as a function of the difference between the expected and actual engine performance over time. An FIR filter, IIR filter, Kalman filter and the integral term of a PID controller each account for differences in the expected and measured engine performance over time and use the differences gathered over time in modifying the determination of present and future fuel parameter adjustments. The PID further takes into account a rate of change in expected and measured engine performance (differential term) and the magnitude of the difference (proportional term) in expected and measured engine performance to account for present system performance.

In an implementation where the fuel parameter indicating sensor 320 is a lambda sensor, such as an oxygen sensor in the engine's exhaust, the fuel parameter adjustment determiner 326 determines the fuel parameter adjustment as a function of the difference in lambda measured by the sensor 320 and the lambda set-point output by the lambda set-point determiner 324. If the measured lambda is different than the lambda set-point, then a fuel parameter adjustment is generated and output from the fuel parameter adjustment 326.

In an implementation where the fuel parameter indicating sensor 320 is an engine output power sensor, such as a kilowatt sensor coupled to a generator driven by the engine (not specifically shown) or a sensor directly measuring the power output of the engine, the fuel parameter adjustment determiner 326 determines an expected engine power output for the given lambda set-point and fuel parameter and determines the fuel parameter adjustment as a function of the difference between the expected engine power output and the measured engine power output. If the measured engine power output is different than the expected engine power output, then a fuel parameter adjustment is generated and output from the fuel parameter adjustment determiner 326. In determining the expected power output of the engine, the fuel parameter adjustment determiner 326 can utilize the lambda set point, as well as inputs from the torque indicating sensor 316, engine speed sensor 318, and an optional input 314 such as intake temperature.

The fuel parameter determiner 330 receives the fuel parameter adjustment and determines an updated fuel parameter. The updated fuel parameter is used together with the lambda set-point in determining the actuator control signal. The ECM 104 can be queried by a user or another device to output the updated fuel parameter. The updated fuel parameter is useful in that it provides a measurement of the specific energy of the fuel being supplied to the engine or the stoichiometry of the combustion reaction. In determining the updated fuel parameter, the fuel parameter determiner 330 determines a fuel parameter compensation, uses the fuel parameter compensation to update a prior fuel parameter or a specified fuel parameter to which the lambda set-point determiner 324 is calibrated, and outputs the updated fuel parameter. In the illustrative ECM 104, the fuel parameter compensation is added to a prior fuel parameter, a base fuel parameter (discussed below), or a specified fuel parameter to which the lambda set-point determiner 324 is calibrated; however, it is anticipated that the fuel parameter compensation could be applied as a multiplier or other formulaic calculation. If the fuel parameter adjustment determiner 326 is disabled, the fuel parameter adjustment value becomes zero and the updated fuel parameter will equal the prior or specified fuel parameter. In start-up, the fuel parameter is the specified fuel parameter or a base fuel parameter derived from the fuel definition input 332.

The fuel parameter adjustment determiner 326 can optionally be disabled by a user input 328 or by the ECM 104 itself as a result of a failed diagnostic. For example, the ECM 104 can be configured to monitor for failure of the fuel parameter indicating sensor 320 and/or other components of the engine system 100 and output a signal in response to a detected failure. The ECM 104 can be further configured to enter a "limp-home" mode in which it disables the fuel parameter adjustment determiner 326 to cease updating the fuel parameter or reverts to the base or specified fuel parameter value if it is determined that further updates are likely to be inaccurate, unreliable, damage a component of the system 100, negatively affect operation of the engine system 100, or otherwise.

Assuming no engine wear, damage, or modifications that would affect the engine's performance, if the fuel parameter accurately reflects the fuel being supplied to the engine, the engine should produce the expected performance and the fuel parameter adjustment determiner 324 should output a zero adjustment. However, if the engine is supplied with a fuel that is different from the fuel to which the fuel parameter correlates, the engine performance may differ from the expected engine response. Such difference would be apparent from the output of the fuel parameter indicating sensor 320. The fuel parameter adjustment determiner 326 would detect the difference, output a fuel parameter adjustment, and the fuel parameter determiner 330 would determine an updated fuel parameter. Engine wear, damage or modifications that affect the engine's performance would also be apparent from the fuel parameter indicating sensor 320, and thus are accounted for.

Of note, a given fuel parameter is not unique to a particular lambda set-point, but rather, is applicable globally across all or a range of engine operating conditions and lambda set-points in determining the actuator control signal. For example, if the fuel parameter is determined while the engine is operating at one lambda set-point, the fuel parameter is applicable if the engine changes to operate at a different lambda set-point. Also, if desired, the ECM 104 can be configured to not use the fuel parameter or revert to a different or the base fuel parameter in certain ranges of engine operation. Because the fuel parameter is applicable across a range of different operating conditions, its effect on engine operation in different operating conditions is preemptive rather than reactive. Use of a fuel parameter is preemptive in the sense that the ECM 104 knows and can compensate accordingly for variances in fuel at different operating conditions based on the base fuel parameter or a fuel parameter determined at one operating condition before having operated at the different operating conditions. This has the effect of adding feed forward adjustment to the controller; the feed forward being adaptively learned as a global model. In contrast, a reactive system (such as a conventional lambda control) would have to operate at each given operating condition before determining the compensation at the respective operating condition.

Figure 4:
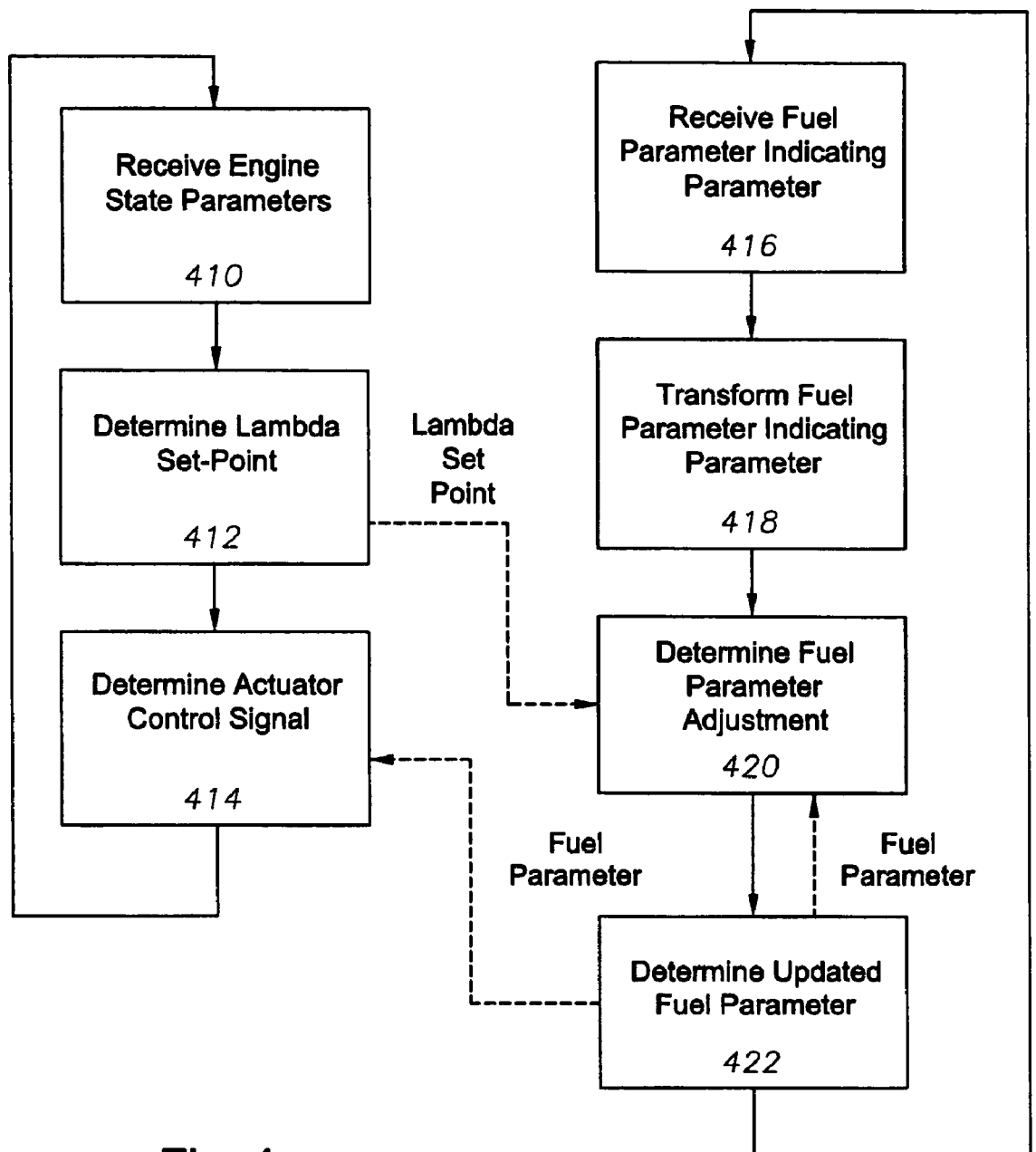
FIG. 4 is a flow diagram of the operation of an engine control module constructed in accordance with the invention.

Referring to FIG. 4, the operation of the ECM 104 is depicted schematically. At 410 the ECM receives engine state parameters, such as engine speed and torque indicating characteristic. At 412, the ECM determines a lambda set-point based on the engine state parameters. Thereafter, at 414 the ECM determines an actuator control signal as a function of a lambda set-point and a fuel parameter. After determining the actuator control signal, the ECM then returns to task 410 and begins again.

In the first iteration of the method, the ECM uses the base fuel parameter derived from the fuel definition input 332 (FIG. 3) or a stored specified fuel parameter in determining the actuator control signal. In subsequent iterations, the ECM updates the fuel parameter and uses the updated fuel parameter in determining the actuator control signal. To this end, the ECM receives the fuel parameter indicating parameter at 416, such as an output from a lambda sensor or a power sensor on a generator driven by the engine. The fuel parameter indicating parameter can be optionally transformed at 418. The lambda set-point determined at 412 is used at 420 together with the fuel parameter to determine a fuel parameter adjustment as a function of the measured engine performance and the expected engine performance. At 422, the fuel parameter is determined according to the fuel parameter adjustment. After determining the fuel parameter, the ECM returns to task 416 and begins again.

The tasks 416–422 can be performed substantially concurrently with the tasks 410–414, in sequence before or after tasks 410–414, or at any other time. The tasks 410–414 and 416–422 can be repeated continually in regular intervals or when changes in engine state parameters and/or fuel parameter indicating parameters are detected.

Figure 5:
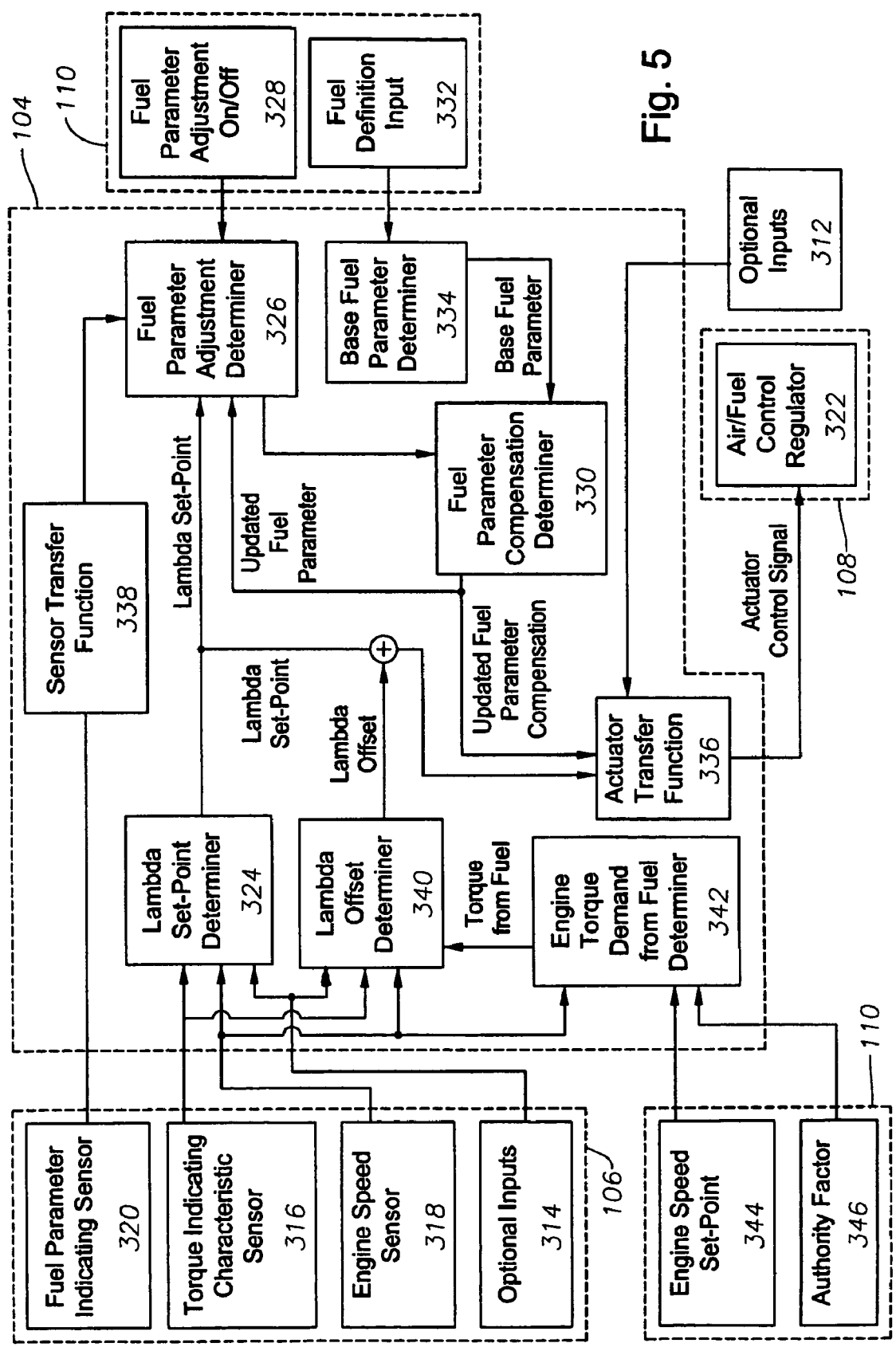
FIG. 5 is a schematic of the functional operation of an alternate engine system constructed in accordance with the invention.

Referring to FIG. 5, the ECM 104 can further include provisions for transient condition fuel adjustment. In transient conditions, when the engine is accelerated or decelerated in either torque, speed or both, the air/fuel ratio will tend to lean out during the acceleration and richen during the deceleration. To compensate for this effect during acceleration, the ECM 104 momentarily increases the amount of fuel supplied to the engine when running lean or near stoichiometric (i.e. richens the air/fuel ratio) beyond what is required to operate the engine at the newly specified steady state operating condition. Increasing the amount of fuel supplied during acceleration increases the engine's torque output and produces a more responsive performance and quicker acceptance of an increased torque loading. During deceleration, the ECM 104 decreases the amount of fuel supplied (i.e. leans air/fuel ratio) below that required by the engine at the newly specified steady state operating condition helping the engine shed unwanted torque output and prevent overspeeding.

The ECM 104 includes a lambda offset determiner 340 that receives an input from a torque demand from air/fuel ratio determiner 342 and determines the amount to increase or decrease the lambda set-point. The torque demand from air/fuel ratio determiner 342 determines, based on an input fuel enrichment authority factor 346 and engine state parameters, the amount of fueling change (momentary increase or decrease in lambda set-point) to be used in achieving the desired acceleration or deceleration in torque or engine speed (hereinafter "torque from fuel"). The output of the lambda offset determiner 340 is a lambda offset (a positive or negative value) that modifies the lambda set-point prior to the actuator transfer function 336. In the illustrative ECM 104, the lambda offset is added to the lambda set-point; however, it is anticipated that the lambda offset could be applied as a multiplier or other formulaic calculation. The lambda offset determiner 340 can determine a lambda set-point offset using a look-up table correlating torque from fuel and one or more engine state parameters, such as MAP or IMD from the torque indicating characteristic sensor 316 and engine speed from the engine speed sensor 318, to lambda set-point offset values. Alternately, or in combination with a look-up table, the lambda offset determiner 340 can use a formulaic calculation to determine the lambda set-point offset.

Figure 6:
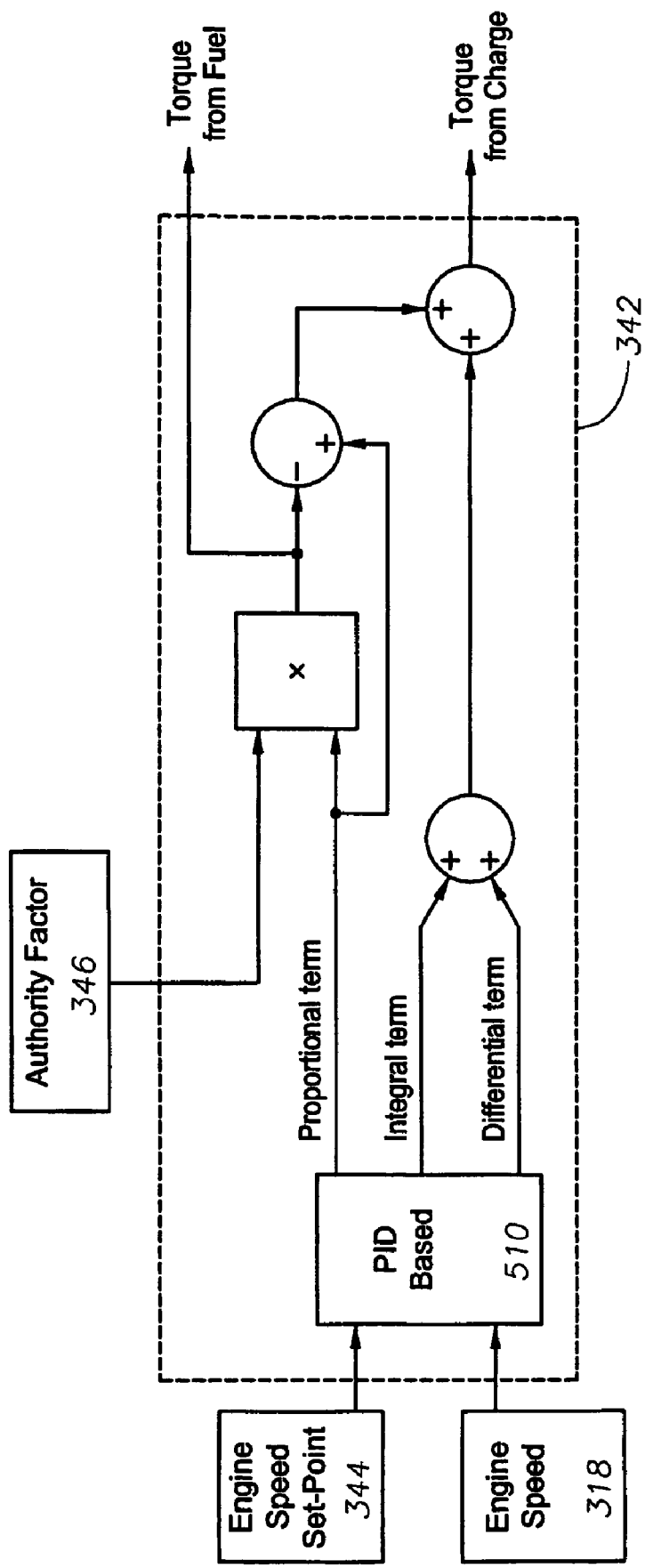
FIG. 6 is a schematic of the functional operation of an engine torque demand determiner for use in an engine system constructed in accordance with the invention.

FIG. 6 depicts the functional operation of an illustrative torque demand from fuel determiner suitable for determiner 342. The illustrative determiner 342 includes a PID controller 510, such as a PID controller that is used in the engine's governor. The PID controller 510, if configured to maintain steady state engine speed, receives a user defined engine speed set-point 344 and measured engine speed from the engine speed sensor 318. The PID controller 510 determines a proportional term indicative of the difference between the engine speed set-point 344 and the measured engine speed (i.e. error), an integral term indicative of the integral of the error with time, and a differential term indicative of the rate of change of error with time. The proportional term is factored by the fuel enrichment authority factor 346 and output as the torque from fuel. The remainder of the proportional term, i.e. the difference between the proportional term and proportional term factored by the authority factor 346, is summed with the integral term and differential term and output as the torque from charge control. Alternately, the determiner 342 can use the proportional and differential terms factored by the fuel enrichment authority factor 346 in determining the torque from air/fuel ratio and use the remainder of the proportional and differential terms with the integral term to determine the torque from charge control. The torque from charge control can be used in operating a throttle valve in the intake of the engine to control the amount of combustion mixture (charge) supplied to the engine. In either instance, at steady state operation the proportional and differential terms will be equal to zero. Thus, the torque from fuel will also be zero, and not modify the lambda set-point. However, in acceleration or deceleration, non-zero values of the proportional and differential terms result in a non-zero torque from fuel that modifies from the lambda set-point. The transient fuel adjustment can be disabled by setting the fuel enrichment authority factor 346 to zero.

Figure 7:
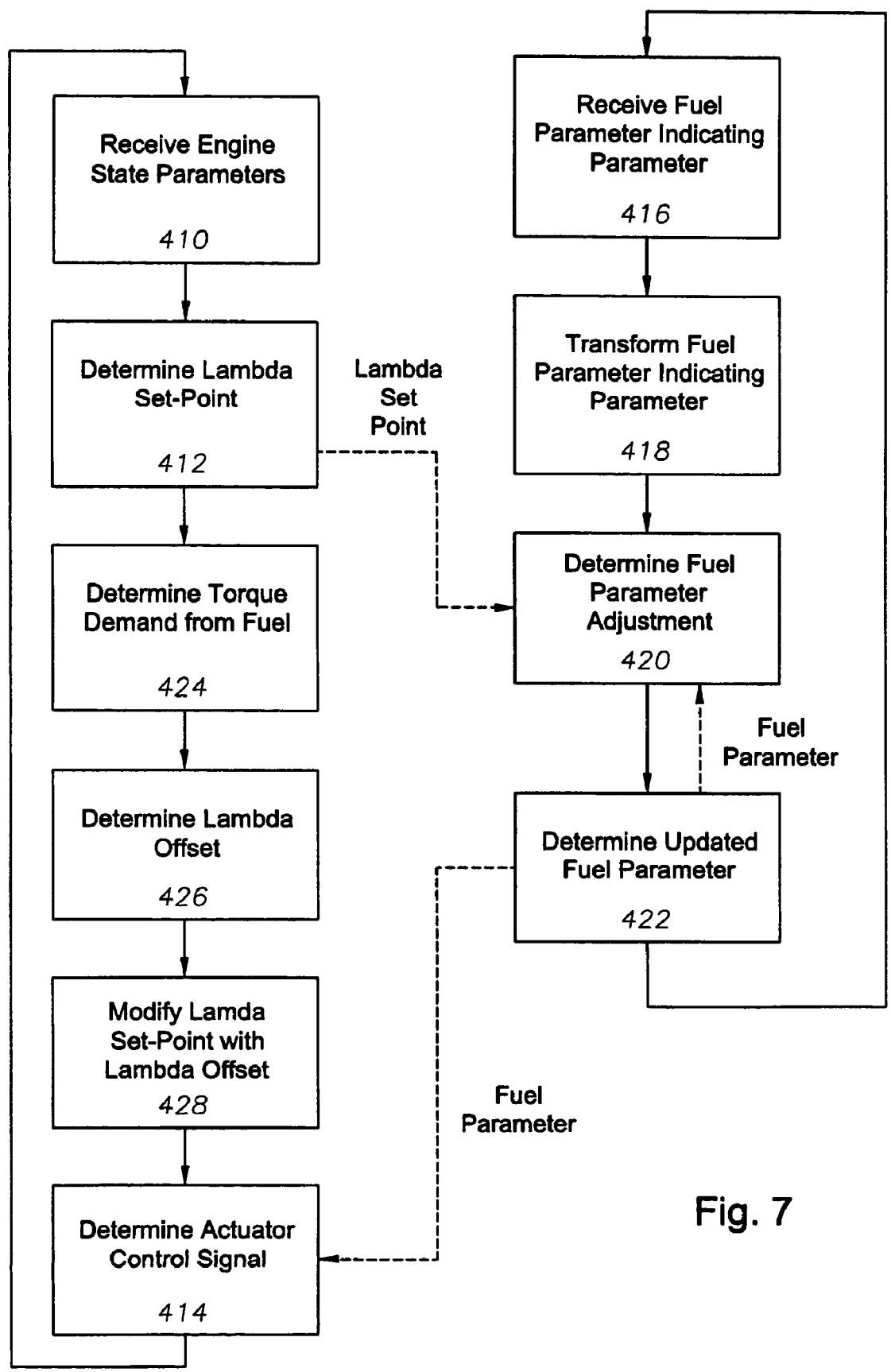
FIG. 7 is a flow diagram of the operation of an engine control module in accordance with the invention.

FIG. 7 schematically depicts the operation of the ECM 104 having transient condition fuel adjustment. At 410 the ECM receives engine state parameters, such as engine speed and torque indicating characteristic. At 412, the ECM determines a lambda set-point based on the engine state parameters. The ECM determines the torque demand from fuel at 424 and, if the torque demand is a non-zero value, determines a lambda offset at 426. At 428 the lambda set-point is modified according to the lambda offset. Thereafter, at 414 the ECM determines an actuator control signal as a function of a lambda set-point and a fuel parameter. After determining the actuator control signal, the ECM returns to task 410 and begins again.

In the first iteration of the method, the ECM uses the base fuel parameter derived from the fuel definition input 332 (FIG. 3) or a stored specified fuel parameter in determining the actuator control signal. In subsequent iterations, the ECM updates the fuel parameter and uses the updated fuel parameter in determining the actuator control signal. To this end, the ECM receives the fuel parameter indicating parameter at 416, such as an output from a lambda sensor or a power sensor on a generator driven by the engine. The fuel parameter indicating parameter can be optionally transformed at 418. The lambda set-point determined at 412 is used at 420 together with the fuel parameter to determine a fuel parameter adjustment as a function of the measured engine performance and the expected engine performance. At 422, a fuel parameter is determined according to the fuel parameter adjustment. After determining the fuel parameter, the ECM returns to task 416 and begins again.

The tasks 416–422 can be performed substantially concurrently with the tasks 410–414 and 424–428, in sequence before or after tasks 410–414 and 424–428, or at any other time. Likewise, tasks 410–414 can be performed concurrently with tasks 424–428. The tasks 410–414 and 424–428 and tasks 416–422 can be repeated continually in regular intervals or when changes in engine state parameters and/or fuel parameter indicating parameters are detected.

The ECM 104, in either of the configurations of FIG. 3 or 5, may optionally include feed forward compensation by communicating with a load or a controller for a load (not specifically shown) applied to the engine to derive a load coming signal. The lambda set-point determiner 324 can thus receive a load coming signal indicating changes in loading, and optionally the magnitude of the load coming, as an optional input 314. Using the load coming signal, the lambda set-point determiner 324 can anticipate engine output requirements based on upcoming changes in load communicated by the load coming signal and adjust the determined lambda set-point in anticipation of the upcoming changes in load. Alternatively or in combination with the lambda set-point determiner 324 receiving a load coming signal, the lambda offset determiner 340 can receive the load coming signal and determine a lambda offset based at least in part on the load coming signal indicating changes in loading and optionally the magnitude of the load coming. An example of a feed forward compensation that can be used in the engine system 100 is disclosed in U.S. Pat. No. 6,564,477, entitled Feedforward Engine Control Governing System, the disclosure of which is incorporated herein in its entirety.

An engine system constructed in accordance with the invention has several advantages. For example, use of a fuel parameter based compensation accounts for unintentional and intentional variances in fuel, such as the fuel quality, amount of contaminate, and mixture ratios of multipart fuels. Engine wear, damage, or modifications are also accounted for to the extent they affect the engine's performance relative to the expected performance. As such, the consistency in steady state operation using a fuel parameter is improved. Unlike a typical closed loop lambda control that senses a difference in a measured lambda and the current lambda set-point and iteratively adjusts the air/fuel control up or down until the lambda set-point is met, the fuel parameter based control described herein globally modifies control of the air/fuel control regulator as a function of the specific energy of the fuel or the stoichiometry of the combustion reaction. In other words, the fuel parameter compensation described herein is applicable globally across all or a range of engine operating conditions and lambda set-points in determining the actuator control signal, whereas a conventional closed loop lambda control's iterative adjustments relate only to the specific engine operating condition and lambda set-point at which the adjustment was made. The fuel parameter compensation described herein is intelligent and makes adjustments of calculated magnitude, whereas a conventional closed loop lambda control makes set magnitude adjustments. The fuel parameter compensation described herein preemptively modifies the fuel control for variances in fuel, whereas a conventional closed loop lambda control reactively modifies the fuel control. While the engine system described herein is described with respect to an open loop control scheme, it is within the scope of the invention to use the fuel parameter based control in an engine system using closed loop lambda control.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   an engine;
   an air/fuel regulator adapted to control at least one of an amount of air and an amount of fuel supplied to the engine;
   a sensor adapted to sense a characteristic indicative of the engine's power output; and
   a controller coupled to the sensor and to the air/fuel regulator and adapted to:
   signal the air/fuel regulator to control at least one of the amount of air and the amount of fuel supplied to the engine over a range of engine operation in response to a plurality of engine control set-points adapted to operate the engine within the range and a fuel parameter applicable evenly throughout the range, the fuel parameter being indicative of a composition of the fuel; and
   adjust the fuel parameter as a function of the sensed characteristic indicative of the engine's power output and an expected engine power output.

2. The system of claim 1 wherein the controller is adapted to:
   determine the expected engine power output for at least one of the engine control set-points,
   adjust the fuel parameter as a function of a difference between the engine's power output and the expected engine power output.

3. The system of claim 2 wherein the controller is adapted to adjust the fuel parameter as a function of at least a rate of change of the difference between engine's power output and the expected engine power output.

4. The system of claim 1 wherein a base fuel parameter is specified to the controller and the controller is adapted to initially adjust the base fuel parameter.

5. The system of claim 1 wherein the fuel parameter is related to at least one of the specific energy of the fuel and the stoichiometry of the combustion reaction.

6. The system of claim 1 wherein the controller is further adapted to at least one of richen the air/fuel supply to the engine when the engine is accelerated and lean the air/fuel supply to the engine when the engine is decelerated as a function of at least one of a difference between an operational set-point and a measured engine operation and a rate of change of the difference between the operational set-point and the measured engine operation; and
   wherein the operational set-point comprises at least one of an engine speed and an engine torque.

7. The system of claim 6 wherein the air/fuel supply to the engine is further adjusted as a function of an authority parameter that is factored with at least one of the difference between the operational set-point and the measured engine operation and the rate of change of the difference between the operational set-point and the measured engine operation.

8. The system of claim 1 wherein the controller is adapted to communicate with a load to receive a load coming signal indicative of an upcoming change in loading applied to the engine and signal the air/fuel regulator to control the air/fuel ratio supplied to the engine further in response to the load coming signal.

9. The system of claim 1 wherein the controller is adapted to determine an adjustment to the fuel parameter using at least one of a finite impulse response filter, infinite impulse response filter, a Kalman filter, and a proportional/integral/differential controller.

10. The system of claim 1 wherein the controller is adapted to adjust the fuel parameter as a function of the engine's power output over time.

11. The system of claim 1 wherein the controller is adapted to at least one of cease adjusting the fuel parameter and revert to a prior fuel parameter upon sensing a failure in one or more components of the system.

12. A system comprising:
   an engine;
   an air/fuel regulator adapted to control at least one of an amount of air and an amount of fuel supplied to the engine;
   a sensor adapted to sense a characteristic indicative of a lambda of a mixture combusted by the engine; and
   a controller coupled to the sensor and to the air/fuel regulator and adapted to:
      receive a fuel definition input and determine a fuel parameter from the fuel definition input;
      signal the air/fuel regulator to control at least one of the amount of air and the amount of fuel supplied to the engine over a range of engine operation in response to a plurality of engine control set-points adapted to operate the engine within the range and the fuel parameter applicable evenly throughout the range, the fuel parameter being indicative of a composition of the fuel;
      adjust the fuel parameter as a function of the characteristic indicative of the lambda of the mixture combusted by the engine.

13. A method for controlling an engine system comprising:
   adjusting an air/fuel mixture supplied to the engine over a range of engine operating conditions as a function of a plurality of engine set-points adapted to operate the engine within the range and a fuel parameter applicable evenly throughout the range, the fuel parameter indicative of a composition of the fuel;
   receiving a signal that is indicative of the engine's power output; and
   adjusting the fuel parameter as a function of the signal indicative of the engine's power output and an expected engine power output.

14. The method of claim 13 wherein adjusting the fuel parameter comprises:
   determining the expected engine power output for at least one of the engine set-points; and
   adjusting the fuel parameter as a function of a difference between the signal indicative of the engine's power output and the expected engine power output.

15. The method of claim 14 wherein adjusting the fuel parameter comprises adjusting the fuel parameter as a function of at least a rate of change of the difference between the engine's-power output and the expected engine power output.

16. The method of claim 13 wherein the fuel parameter is related to at least one of the specific energy of the fuel and the stoichiometry of the combustion reaction.

17. The method of claim 13 further comprising:
   receiving a fuel definition;
   initially determining the fuel parameter from the fuel definition; and
   wherein adjusting the fuel parameter comprises adjusting the initially determined fuel parameter.

18. The method of claim 13 wherein the engine set-point is indicative of a desired ratio of an actual air to fuel ratio to a stoichiometric ratio.

19. The method of claim 13 further comprising adjusting an air/fuel ratio richer when the engine is accelerated as a function of at least one of a difference between an engine operational set-point and a measured engine operation and a rate of change of the difference between the engine operational set-point and the measured engine operation, wherein the operational set-point comprises at least one of an engine speed and an engine torque.

20. The method of claim 19 wherein the air/fuel ratio is adjusted further as a function of an authority parameter that is factored with at least one of the difference between the engine operational set-point and the measured engine operation and the rate of change of the difference between the operational set-point and the measured engine operation.

21. The method of claim 13 further comprising:
   receiving a load coming signal indicative of an upcoming change in loading applied to the engine; and
   adjusting the air/fuel mixture in relation to the load coming signal.

22. The method of claim 13 wherein adjusting the fuel parameter comprises adjusting the fuel parameter with at least one of a finite impulse response filter, an infinite impulse response filter, a Kalman filter, and a proportional/integral/differential controller.

23. The method of claim 13 wherein adjusting the fuel parameter in relation to the engine's power output comprises adjusting the fuel parameter as a function of the engine's power output over time.

24. The method of claim 13 further comprising at least one of ceasing adjusting the fuel parameter and reverting to a prior fuel parameter upon sensing a failure in one or more components of the engine system.

25. A method for controlling an engine system comprising:
   receiving a fuel definition;
   initially determining a fuel parameter from the fuel definition;
   adjusting an air/fuel mixture supplied to the engine over a range of engine operating conditions as a function of a plurality of engine set-points adapted to operate the engine within the range and the fuel parameter applicable evenly throughout the range, the fuel parameter indicative of a composition of the fuel;
   receiving a signal that is indicative of a lambda of the mixture combusted by the engine;
   adjusting the fuel parameter as a function of the signal indicative of the lambda of the mixture combusted by the engine.

26. An article comprising a machine-readable medium storing instructions adapted to cause one or more machines to perform operations comprising:
   determining regulator control signals over a range of engine operation in relation to a plurality of engine set-points adapted to operate the engine within the range and a fuel parameter applicable evenly throughout the range, the regulator control signal adapted to signal a regulator to adjust an air/fuel mixture supplied to an engine, the fuel parameter indicative of a composition of a fuel supplied to the engine;
   receiving a signal indicative of the engine's power output; and
   adjusting the fuel parameter as a function of the signal indicative of the engine's power output and an expected power output.

27. The article of claim 26 wherein the instructions are further adapted to cause one or more machines to perform operations comprising:
   determining the expected engine power output for at least one of the engine set-points; and
   adjusting the fuel parameter as a function of a difference between the signal indicative of the engine's power output and the expected engine power output.

28. The article of claim 27 wherein adjusting the fuel parameter comprises adjusting the fuel parameter as a function of at least a rate of change of the difference between the engine's power output and the expected engine power output.

29. The article of claim 26 wherein the fuel parameter is related to at least one of the specific energy of the fuel and the stoichiometry of the combustion reaction.

30. The article of claim 26 wherein the instructions are further adapted to cause one or more machines to perform operations comprising:
   receiving a fuel definition;
   initially determining the fuel parameter from the fuel definition; and
   wherein adjusting the fuel parameter comprises adjusting the initially determined fuel parameter.

31. The article of claim 26 wherein the engine set point is indicative of a desired ratio of an actual air to fuel ratio to a stoichiometric ratio.

32. The article of claim 26 wherein the instructions are further adapted to cause one or more machines to perform operations comprising:
   determining a regulator control signal when the engine is accelerated as a function of at least one of a difference between an engine operational set-point and a measured engine operation and a rate of change of the difference between the engine operational set-point and the measured engine operation, wherein the engine operational set-point is at least one of engine speed and engine torque.

33. The article of claim 32 wherein the instructions are further adapted to cause one or more machines to perform operations comprising:
   further determining the regulator control signal as a function of an authority parameter that is factored with at least one of the difference between the engine operational set-point and the measured engine operation and the rate of change of the difference between the engine operational set-point and the measured engine operation.

34. The article of claim 26 wherein the instructions are further adapted to cause one or more machines to perform operations comprising:
   receiving a load coming signal indicative of an upcoming change in loading applied to the engine; and
   determining a regulator control signal in relation to the load coming signal.

35. The article of claim 26 wherein adjusting the fuel parameter comprises adjusting the fuel parameter with at least one of a finite impulse response filter, an infinite impulse response filter, a Kalman filter, and a proportional/integral/differential controller.

36. The article of claim 26 wherein adjusting the fuel parameter in relation to the engine's power output comprises adjusting the fuel parameter as a function of the engine's power output over time.

37. The article of claim 26 wherein the instructions are further adapted to cause one or more machines to perform operations comprising:
   at least one of cease adjusting the fuel parameter and reverting to a prior fuel parameter upon sensing a failure in one or more components of the engine.

38. An article comprising a machine-readable medium storing instructions adapted to cause one or more machines to perform operations comprising:
   receiving a fuel definition;
   initially determining a fuel parameter from the fuel definition; and
   determining regulator control signals over a range of engine operation in relation to a plurality of engine set-points adapted to operate the engine within the range and a fuel parameter applicable evenly throughout the range, the regulator control signal adapted to signal a regulator to adjust an air/fuel mixture supplied to an engine, the fuel parameter indicative of a composition of a fuel supplied to the engine;
   receiving a signal indicative of a lambda of a mixture combusted by the engine; and
   adjusting the fuel parameter in relation to the signal indicative of the lambda of the mixture combusted by the engine.

* * * * *